(12) United States Patent
Chou et al.

(10) Patent No.: US 6,735,493 B1
(45) Date of Patent: May 11, 2004

(54) RECIPE MANAGEMENT SYSTEM

(75) Inventors: Alton Chou, Jubei (TW); Chen-Hsien Wei, Namton (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 10/274,575

(22) Filed: Oct. 21, 2002

(51) Int. Cl.[7] ............................................... G06F 19/00
(52) U.S. Cl. ...................... 700/121; 700/96; 700/110; 707/203; 717/170
(58) Field of Search ....................... 700/26, 27, 96, 700/109, 110, 117, 121; 707/203; 717/170–173, 168

(56) References Cited

U.S. PATENT DOCUMENTS

| | | | |
|---|---|---|---|
| 5,761,064 A | * 6/1998 | La et al. ..................... | 700/110 |
| 5,896,294 A | * 4/1999 | Chow et al. ................. | 700/121 |
| 6,035,293 A | * 3/2000 | Lantz et al. .................... | 707/1 |
| 6,165,805 A | * 12/2000 | Steffan et al. ................ | 438/14 |
| 6,185,474 B1 | 2/2001 | Nakamura et al. .......... | 700/121 |
| 6,415,193 B1 | * 7/2002 | Betawar et al. ............... | 700/97 |
| 6,465,263 B1 | * 10/2002 | Coss et al. ..................... | 438/14 |
| 2002/0183950 A1 | * 12/2002 | Fu et al. ......................... | 702/84 |
| 2003/0204281 A1 | * 10/2003 | Su et al. ...................... | 700/108 |

OTHER PUBLICATIONS

W. Jarret Campbell, PH. D., "Run–to–Run Control of Photolithography Processes," Special Focus Lithography, Yield Management Solutions, Summer 2000, pp. 65–68.

* cited by examiner

Primary Examiner—Leo Picard
Assistant Examiner—Paul Rodriguez
(74) Attorney, Agent, or Firm—Duane Morris LLP

(57) ABSTRACT

A recipe management system is provided including a processor configured to receive a first job file for a processing tool through a network, said first job file including a master job file for said processing tool. The processor also receives a second job file through the network from a host processor associated with the processing tool. The processor compares the first and second job files, wherein the processor determines whether the first and second job files differ. A semiconductor manufacturing method is also provided. A first job file including a master job file for a processing tool is received through a network. A second job file is also received through the network from a host processor associate with the processing tool The job files are then compared to determine whether the first and second job files differ.

27 Claims, 3 Drawing Sheets

RECIPE MANAGEMENT SYSTEM

FIELD OF INVENTION

The present invention relates to recipe management systems for semiconductor fabrication processes, and more particularly to recipe management systems for comparing recipe versions for semiconductor processing tools utilized in the semiconductor fabrication process.

BACKGROUND OF THE INVENTION

Recipe management systems are used in a semiconductor fabrication process to manage recipe correction and to prevent process engineers from running incorrect and non-approved recipes. A prior art recipe management system is described hereafter in connection with the fabrication system diagram of FIG. 1. The fabrication system 10 includes a database 12 connected to a Recipe Management System (RMS) server 14. The database includes a plurality of master recipe bodies for select tools used in the semiconductor process, including etch tools, deposition tools such as the Applied Material P5000 Mark II tool, and photolithography tools, such as a track tool 18. As should be known to those familiar with manufacturing integrated circuits, track tools have three main purposes in the process: (1) coating photoresist on a wafer; (2) baking the wafer; and (3) developing a circuit pattern on the wafer. Recipes for scanner and stepper photolithography tools are typically not stored in database 12.

RMS server 14 is shown connected to Industrial PC (IPC) 16. IPC 16 includes a computer integrated manufacturing (CIM) software package including a Tool Control System (TCS) for implementing task flow control for operating a tool such as track 18. Track 18 is shown as part of an inline tool physically combining at least two pieces of equipment, such as track 18 and stepper 20. IPC 16 communicates with track 18 using the Semiconductor Equipment Communications Standard (SECS) via low speed RS-232 serial lines. IPC 16 receives a recipe from the database 12 through RMS server 14. IPC 16 then uses the recipe to directly control the track 18 by issuing SECS commands. RMS server 14 is connected to database 12 and IPC 16 via an Ethernet connection.

A process recipe is sometimes modified by a process engineer at the IPC 16 for, for example, experimental test runs of processing tools. During actual process runs, however, it should be confirmed that the recipe that is being used by the IPC 16 to control the track tool 18 conforms to a master recipe in the database 12, which has been approved for use in a specific fabrication process. In order to accomplish this, the recipe currently resident at the IPC 16 is uploaded to the RMS server 14. The corresponding master recipe is also retrieved by the RMS sever 14 from the database 12. The bodies, i.e., the contents, of these recipes are then compared by the RMS server 14. If a match occurs, a message is sent to the IPC 16 indicating that the recipe is approved for use and the track tool is operated in the fabrication process. If a match does not occur, a mismatch message is sent to the IPC 16 indicating the need to retrieve an approved recipe from the database 12.

The RMS server 14 also handles recipe version management. A new version of a recipe stored in database 12 may be created at IPC 16, uploaded to RMS server 14 and stored as a new version of the corresponding recipe in database 12, thereby becoming an approved recipe.

Also shown in system 10 of FIG. 1 is Unix server 24. Unix server 24 includes a plurality of recipes for semiconductor exposure tools such as steppers and scanners. These recipes are also called job files. As one of ordinary skill will recognize, a stepper is an optical-based system that projects the pattern of a reticle onto a small area on the surface of the wafer. The projected image forms the processing pattern for one chip. The wafer is stepped in the X and Y directions to repeat the imaging for other chips. A scanner is also an exposure tool, only with a larger lens that the stepper.

Although shown connected to only one host 22, Unix server 24 is typically connected to a plurality of hosts. Each host 22 is connected to and associated with a single stepper 20 or scanner. Unix server 24 and host 22 are both industrial workstations, but the Unix server 24 stores master recipe files for steppers 20 and scanners, which are communicate with hosts 22. A typical recipe for a scanner or stepper will include X and Y coordinate information as well as other process parameters, such as light energy and focus information.

The host 22 provides a job file to the stepper 20 or scanner during a fabrication process for control of the stepper 20 or scanner. The host 22 and stepper 20 communicate through an Ethernet connection. Unix server 24 downloads an approved scanner or stepper recipe to host 22 for use in the process over a TCP/IP network using the File Transfer Protocol (FTP). Communications of job files between the Unix server 24 and host 22 are one way as indicated in FIG. 1. A process engineer can use host 22 to modify recipes if desired, such as for testing purposes.

Several problems exist with the system 10 of FIG. 1, particularly with respect to steppers 20 and scanners. The stepper and scanner tools typically become the bottle neck of the fabrication process when recipe file corruption occurs or mismatches occur between recipes in the Unix server 24 and the host 22. Despite this concern, the system 10 as shown in FIG. 1 does not have the ability to compare the recipe resident at host 22 and the recipe at Unix server 24 to determine whether a recipe file has been modified at the host 22. For one reason, recipe body communication between the Unix server 24 and the host 22 is not two way, i.e., the host software does not support exporting the recipe body back to the Unix server 24.

One solution available for ASML brand steppers and scanners available from ASML Co. of Tempe. Ariz. is a software utility installed on the host 22. The utility supports the SECS protocol and allows the Unix server. 24 to respond to a SECS command issued by the host 22. The host 22 issues a SECS command to the Unix sever 24 requesting modification time information for a selected recipe. The host 22 then compares the time information provided by the Unix server 24 for the recipe with the time information associated with the corresponding recipe resident at the host 22. If the time information does not match, the host 22 knows that it does not have the recipe that is resident at the Unix server 24, which must then be downloaded to the host 22. This add-on solution is not very attractive for several reasons. First, the software utility is very expensive, as much as $6,700 per host installation. Second, RS232 serial interface hardware must be added to and between host 22 and server 24. Further, the solution only compares modification times associated with a reipe and not recipe bodies or contents. The solution, therefore, lacks the ability to identify for a process engineer the specific changes that have been made to the recipe.

Therefore, there remains a need for a new, cost effective and robust method of ensuring that recipes being processed by scanners and steppers conform to released master recipes.

To that end, there remains a need for a new method and system for comparing recipes for scanner and stepper tools utilized in the semiconductor manufacturing process.

SUMMARY OF THE INVENTION

A recipe management system is provided including a processor configured to receive a first job file for a processing tool through a network, said first job file including a master job file for said processing tool. The processor also receives a second job file through the network from a host processor associated with the processing tool. The processor compares the first and second job files, wherein the processor determines whether the first and second job files differ.

A semiconductor manufacturing method is also provided. A first job file including a master job file for a processing tool is received through a network. A second job file is also received through the network from a host processor associated with the processing tool The job files are then compared to determine whether the first and second job files differ.

The system and method described above provide a cost effective means of comparing job files, particularly for exposure tools, to ensure that only approved job files are used in the fabrication process. File transfer is accomplished via network communications rather than using lower speed SECS RS-232 serial communications. When comparing exposure unit job files, no separate database of master job files is needed as with comparing track tools in prior art system 10, because the exposure unit job files are already resident at the master job file processor. Further, exposure unit login information can be collected and used for maintenance purposes. Still further, expensive software and hardware solutions are avoided because application tools available with standard operating systems may be utilized to facilitate file transfer. Also, when upgrading a prior art system 10, modifications need only be made to the IPC 16, rather than each host processor 22.

The above and other features of the present invention will be better understood from the following detailed description of the preferred embodiments of the invention that is provided in connection with the accompanying drawings.

BRIEF DESCRIPTION OF DRAWINGS

The accompanying drawings illustrate preferred embodiments of the invention, as well as other information pertinent to the disclosure, in which.

DETAILED DESCRIPTION

Figure 2:
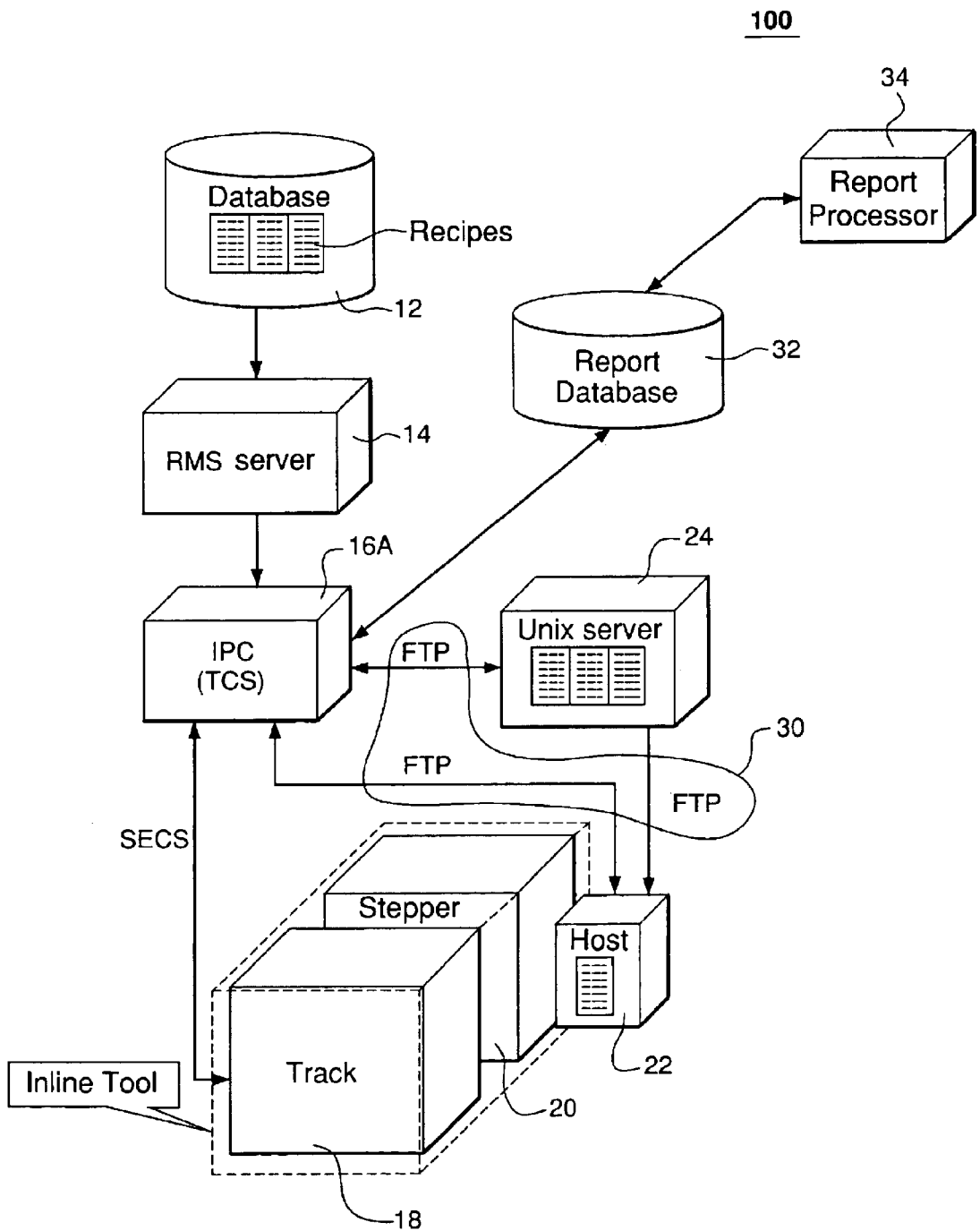
FIG. 2 is a block diagram of an exemplary embodiment of a semiconductor manufacturing system including a recipe management system.

An exemplary recipe management system for semiconductor processing tools, such as photolithography exposure tools, and a fabrication process are described in connection with FIGS. 2 and 3. The recipe management system is shown incorporated within fabrication or processing system 100, which shares several elements with prior art system 10 described above. It should be understood that the recipe management system described herein can operate apart from such a system, but can also be conveniently implemented simultaneously with prior art system 10 described above for a cost effective upgrade to the prior system. Various components from system 100 of FIG. 2 are described hereafter in connection with the flow diagram of FIG. 3.

Figure 3:
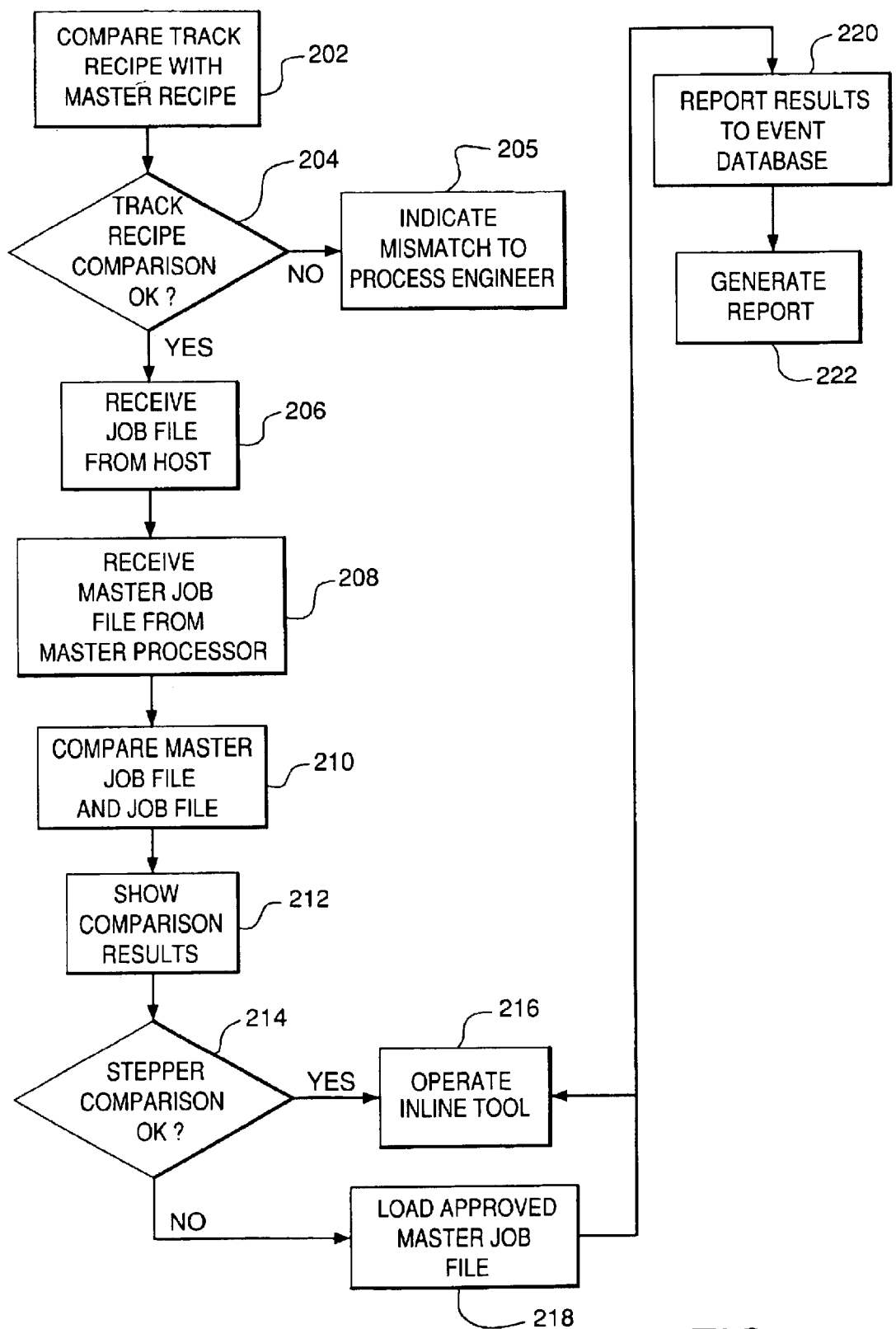
FIG. 3 is a flow diagram illustrating an exemplary semiconductor manufacturing method utilizing recipe comparison.

At step 202 of FIG. 3, the track recipe for track 18 resident at IPC 16A and a corresponding master recipe for the track processing tool from database 12 are compared to determine if they differ. This may be accomplished as described in the "Background of the Invention" section. In summary, the RMS server 14 receives a copy of the track recipe from the IPC 16A and a copy of the master recipe from database 12 and compares the two files. If the comparison indicates a mismatch (step 204) the RMS server 14 indicates the mismatch for the process engineer (step 205). If the recipe comparison indicates that the recipes match (step 204), then the process flow moves to the comparison of the stepper recipes. As described, the track recipes are preferably compared before the stepper recipes because the track operates in the fabrication process before the stepper 20. As shown, the track 18 and stepper 20 may form part of the same inline tool.

Figure 1:
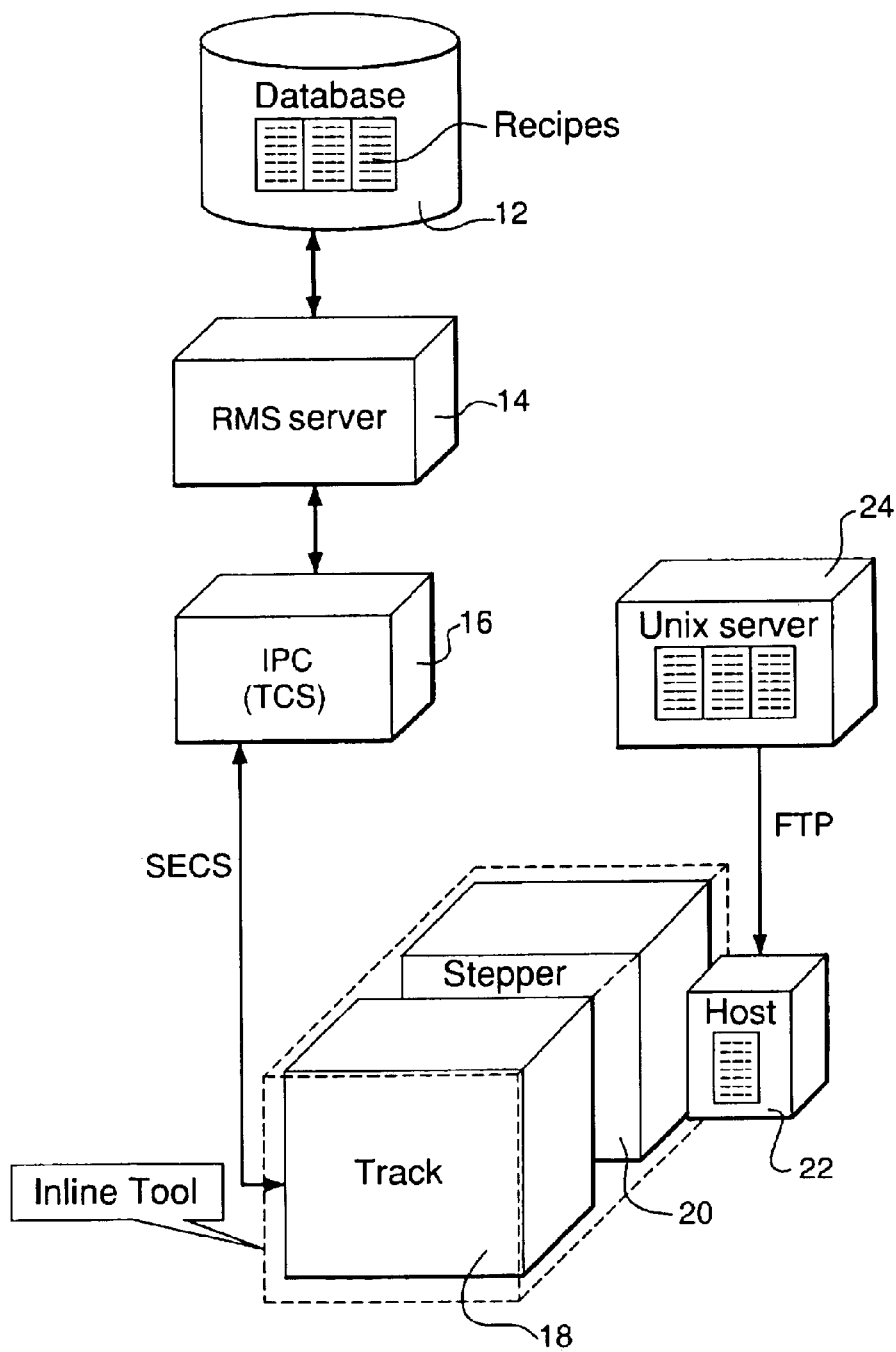
FIG. 1 is a block diagram of a prior art semiconductor manufacturing system including a recipe management system.

In the system 100, a processor, such as IPC 16A, is connected to a master job file processor, such as Unix server 24, through a network 30. The IPC 16A is also connected to at least one host processor 22 associated with an exposure tool (such as a stepper 20 or scanner) through network 30. As with system 10, Unix server 24 is connected to host 22 via a network 30 (not shown in FIG. 1) such as an Ethernet network. In one exemplary embodiment of the system 100, the network 30 operates under the TCP/IP protocol, and files are exchanged between IPC 16A and Unix server 24 and host 22, and between Unix server 24 and host 22, using the File Transfer Protocol (FTP).

As with system 10, the master processor, shown as Unix server 24, stores a plurality of master job files for exposure units such as steppers and scanners. When directed by a process engineer, the Unix server 24 provides one or more master recipes to host processor 22 for controlling stepper 20. The process parameters of these master job files, such as energy and focus information, are often modified at the host processor by a process engineer, such as for testing purposes. Before an expensive and time consuming fabrication process is begun, the job file that is to be used in the process should be compared with a master job file to ensure that it is approved for use in the process. In the system 100, job files are only ideally downloaded to the host processor 22 from Unix server 24 when a new job file is created or modified at Unix server 24, unless a mismatch is detected.

At step 206, the IPC 16A receives a job file that is to be used in the fabrication process from the host processor 22 through TCP/IP network 30 using the FTP. Similarly, the IPC 16A receives a corresponding master job file from the master processor 24 through network 30 (step 208).

In one exemplary embodiment, IPC 16A operates with a MICROSOFT WINDOWS operating system. The Win32 internet function of the operating system can then be used as the FTP application programming interface (API). In order to authenticate the host 22 and Unix server 24 for FTP services, the TCS of the IPC 16A maintains a table of login names (such as serial numbers) and passwords for the host processors 22 and the Unix server 24, as well as the IP addresses for the host processors and Unix server. If any information changes, such as an IP address, a login name or password, the table is simply updated. Each time a FTP session is opened between a host processor 22 and the IPC 16A or between the Unix server 24 and the IPC 16A, the host processor 22 or the Unix server 24, as the case may be, is logged into the IPC 16A, assuming a correct handle is provided to IPC 16A. The IPC 16A maintains a record of the logins, which can then be used for maintenance purposes.

The stepper job files received at steps 206 and 208 are then compared at step 210. If the host processor 22 supports parsing of the job file such that its content (e.g., individual process parameters) can be discerned, the comparison step preferably compares the content of the job file received from the host processor 22 and the content of the master job file retrieved from Unix server 24. This provides for the ability to identify specific differences between the contents of the files, e.g., process parameters such as exposure and energy. Current ASML host processors for ASML steppers 20 do not have this parsing ability because the job files are encoded, but a simple software upgrade or modification by a vendor can achieve this functionality. There is currently an edit tool for UNIX operating systems for ASML steppers that can decode a job file into a readable format for modification. The Microsoft WINDOWS operating system is not currently supported. At the very minimum, the binary content of the two stepper job files may be compared to determined whether the two files match.

At step 212, the results of the comparison are displayed to the process engineer, such as in a graphical user interface on an operator interface, e.g., monitor, of the industrial PC 16A. If the comparison indicates a match at 214, a wafer is loaded into the inline tool which is then operated in the fabrication process according to the track job files at the IPC 16A and the stepper job file at host processor 22 (step 216). If the comparison indicates a mismatch, the process engineer directs the Unix server 24 to provide an approved master job file to the host processor 22 (step 218) for use in the fabrication process and the inline tool is operated (step 216).

Any mismatches between the job files are reported by the IPC 16A to an event or report database 32 (step 220). If available, the details of the mismatch, e.g., the particular process parameters that did not match, are reported to the event database. At a minimum, the name of the files that mismatched are reported. This information may then be used by a report processor 34 in order to generate a report (step 222) detailing the mismatch. A report may including information identifying the process date and time, the work area, the equipment identifier, the job file name, an error message (e.g., "Job file did not match"). Such a report may be requested and/or accessed by a process engineer via the Internet or a local or wide area network, thereby providing the ability to gain remote access to mismatch information.

The system and method described above provide a cost effective means of comparing job files for exposure tools to ensure that only approved job files are used in the fabrication process. File transfer can be accomplished via network communications rather than using lower speed SECS RS-232 serial communications. Preferably, the actual recipe contents are compared and any mismatches are reported to an event database, allowing for report generation and remote access to comparison results. When comparing exposure unit job files, no separate database of master job files is needed, as with comparing track tools in prior art system 10, because the exposure unit job files are already resident at the master processor. Further, exposure unit login information can be collected and used for maintenance purposes. Still further, expensive software and hardware solutions are avoided because application tools available with standard operating systems may be utilized to facilitate file transfer. Also, when upgrading a prior art system 10, modifications need only be made to the IPC 16, rather than each host processor 22.

Although described in connection with stepper and scanner tools, it is contemplated that this system and method may be applicable to other tools including hardware and software that support TCP/IP protocol communications and FTP.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention

What is claimed is:

1. A recipe management system, comprising:
   a comparison processor, said comparison processor configured to:
      receive a first job file for a processing tool through a network, said first job file including an approved master job file for said processing tool;
      receive a second job file through said network, said second job file received from a host processor associated with said processing tool; and
      compare said first and second job files, wherein said comparison processor determines whether said first and second job files differ.

2. The system of claim 1, wherein said network utilizes TCP/IP protocol.

3. The system of claim 2, wherein said job files are received using File Transfer Protocol (FTP).

4. The system of claim 1, wherein said comparison processor is further configured to communicate mismatch information to an event database indicating a mismatch between said job files.

5. The system of claim 4, wherein said mismatch information includes comparison information indicating differences between recipe contents of said job files.

6. The system of claim 5, further comprising a report processor configured to generate a report based upon said mismatch information from said event database.

7. The system of claim 1, further comprising a master job file processor for providing a plurality of approved roaster job files, said comparison processor connected to said master job file processor through said network to receive said first job file.

8. The system of claim 7, further comprising said host processor, said host processor connected to said master job file processor, whereby said host processor receives an approved master job file for use in a fabrication process.

9. The system of claim 8, wherein said processing tool is an exposure tool.

10. The system of claim 1, wherein said processing tool is an exposure tool.

11. The system of claim 10, wherein said comparison processor is an industrial PC configured to control a processing tool that is not an exposure tool.

12. The system of claim 10,
    wherein at least one exposure tool is part of an inline tool including a processing tool that is not an exposure tool, and
    wherein said comparison processor is an industrial PC configured to control said processing tool that is not an exposure tool based upon a recipe file using Semiconductor Equipment Communications Standard (SECS).

13. A semiconductor fabrication method, comprising the steps of:
    receiving a first job file for a processing tool through a network, said first job file including an approved master job file for said processing tool;

receiving a second job file through said network, said second job file received from a host processor associated with said processing tool; and comparing said first and second job files to determined whether said first and second job files differ.

14. The method of claim 13, wherein said first and second job files are received through a network utilizing TCP/IP protocol.

15. The method of claim 14, wherein said job files are received using File Transfer Protocol.

16. The method of claim 13, further comprising the steps of communicating mismatch information to an event database indicating a mismatch between said job files and generating a report based upon said mismatch information from said event database.

17. The method of claim 16, wherein said mismatch information includes comparison information indicating differences between recipe contents of said job files.

18. The method of claim 16, wherein said report is accessible through a local area network or the Internet.

19. The method of claim 13, wherein said first job file is received from a master job file processor, said master job file processor configured to provide a plurality of approved master job files.

20. The method of claim 19, further comprising the step of receiving a version of said second job file at said host processor from said master job file processor before said first and second job file receiving steps.

21. The method of claim 20, wherein said processing tool is an exposure tool.

22. The method of claim 13, wherein said processing tool is an exposure tool.

23. The method of claim 22, wherein said receiving and comparing steps are executed by an industrial PC configured to control a processing tool that is not an exposure tool.

24. The method of claim 23, wherein said exposure tool is part of an inline tool including said processing tool that is not an exposure tool, said method further comprising a second comparison step of, before said comparing step, comparing a master job file for said processing tool that is not an exposure tool and a second job file for said processing tool that is not an exposure tool to determine if said files differ.

25. The method of claim 24, wherein said industrial PC executes said comparing step only if said second comparing step indicates that said master job file for said processing tool that is not an exposure unit and a second job file for said processing tool that is not an exposure unit do not differ.

26. The method of claim 13, further comprising the steps of:

operating said processing tool if said job files match; and providing an approved master job file to said host processor from a master job file processor if said job files do not match.

27. A fabrication system, comprising:

a network;

at least one exposure tool for projecting a circuit pattern on a surface of a wafer;

a master job file processor for providing a plurality of approved master job files associated with said exposure tool;

at least one host processor associated with each of said at least one exposure tool; and a comparsion processor, said comparison processor configured to:
receive a first job file for said at least one exposure tool through said network from said master job file processor using File Transfer Protocol (FTP);
receive a second job file through said network from said host processor using FTP; and
compare said first and second job files, wherein said comparison processor determines whether said first and second job files differ.

* * * * *

UNITED STATES PATENT AND TRADEMARK OFFICE
CERTIFICATE OF CORRECTION

PATENT NO. : 6,735,493 B1
DATED : May 11, 2004
INVENTOR(S) : Alton Chou and Chen-Hsien Wei It is certified that error appears in the above-identified patent and that said Letters Patent is hereby corrected as shown below:

Column 2,
Line 61, delete "reipe" and insert therefore -- recipe --; and

Column 6,
Line 39, delete "roaster" and insert therefor -- master --.

Signed and Sealed this

Twenty-first Day of September, 2004

JON W. DUDAS
*Director of the United States Patent and Trademark Office*